United States Patent [19]

Weyer

[11] Patent Number: 5,027,667
[45] Date of Patent: * Jul. 2, 1991

[54] SPRING ACTUATOR WITH ROLLERS

[76] Inventor: Paul P. Weyer, 48811 - 284th Ave. SE., Enumclaw, Wash. 98022

[ * ] Notice: The portion of the term of this patent subsequent to May 3, 2005 has been disclaimed.

[21] Appl. No.: 434,178

[22] Filed: Nov. 13, 1989

Related U.S. Application Data

[63] Continuation-in-part of Ser. No. 126,837, Nov. 30, 1987, Pat. No. 4,881,419, and Ser. No. 204,521, Jun. 9, 1988, Pat. No. 4,945,778, which is a continuation-in-part of Ser. No. 6,007, Jan. 20, 1987, Pat. No. 4,838,103, which is a continuation-in-part of Ser. No. 931,223, Nov. 14, 1986, Pat. No. 4,846,007, which is a continuation-in-part of Ser. No. 881,904, Jul. 3, 1986, Pat. No. 4,741,250, which is a continuation-in-part of Ser. No. 662,256, Oct. 17, 1984, Pat. No. 4,667,528, which is a continuation-in-part of Ser. No. 692,293, Jan. 17, 1985, Pat. No. 4,683,767, which is a continuation-in-part of Ser. No. 803,954, Dec. 2, 1985, Pat. No. 4,691,582, which is a continuation-in-part of Ser. No. 575,228, Jan. 30, 1984, Pat. No. 4,590,816.

[51] Int. Cl.$^5$ .............................. F01B 9/04
[52] U.S. Cl. .................. 74/89.15; 74/424.8 R; 92/2; 92/31
[58] Field of Search ..... 74/89.15, 424.8 R, 424.8 VA; 92/2, 31, 33

[56] References Cited

U.S. PATENT DOCUMENTS

| | | | |
|---|---|---|---|
| 717,987 | 1/1903 | Gurney | 384/504 |
| 2,067,357 | 1/1937 | Terry | 74/424.8 |
| 2,131,151 | 9/1938 | Smith | 74/424.8 |
| 2,317,529 | 4/1943 | Hodgson et al. | 74/424.8 VA |
| 2,482,082 | 9/1949 | Wahlberg | 74/424.8 C |
| 2,488,256 | 11/1949 | Anderson | 74/424.8 C |
| 2,525,326 | 10/1950 | Wahlmark | 74/424.8 C |
| 2,751,789 | 6/1956 | Orenick | 74/424.8 C |
| 2,791,128 | 5/1957 | Geyer et al. | 74/441 |
| 2,930,571 | 3/1960 | Vogl | 74/424.8 VA |
| 2,945,387 | 7/1960 | Geyer | 74/89 |
| 2,959,064 | 11/1960 | Geyer et al. | 74/441 |
| 3,020,775 | 2/1962 | Musser | 74/440 |
| 3,128,634 | 4/1964 | Eastman | 74/424.8 |
| 3,165,007 | 1/1965 | Neubarth | 74/424.8 C |
| 3,187,592 | 6/1965 | Geyer | 74/89 |
| 3,198,539 | 8/1965 | McMullen et al. | 92/31 |
| 3,255,806 | 6/1966 | Meyer et al. | 160/188 |
| 3,295,385 | 1/1967 | Jenny | 74/424.8 C |

(List continued on next page.)

FOREIGN PATENT DOCUMENTS

| | | |
|---|---|---|
| 2260300 | 6/1974 | Fed. Rep. of Germany . |
| 2803459 | 8/1979 | Fed. Rep. of Germany . |
| 2807952 | 8/1979 | Fed. Rep. of Germany . |
| 3144306 | 5/1983 | Fed. Rep. of Germany . |
| 1496924 | 10/1967 | France . |
| 1540855 | 5/1969 | France . |
| 2338425 | 1/1977 | France . |
| 399084 | 10/1942 | Italy ................. 74/424.8 C |
| 81/01440 | 5/1981 | PCT Int'l Appl. . |
| 386809 | 4/1965 | Switzerland . |
| 406747 | 1/1966 | Switzerland . |
| 890440 | 2/1962 | United Kingdom . |
| 1362401 | 8/1974 | United Kingdom . |

OTHER PUBLICATIONS

Spiracon Brochure–Planetary Roller Screws, a Unique Innovation in Mechanical Linear Actuators, A 4-page Brochure (Undated).

(List continued on next page.)

Primary Examiner—Leslie A. Braun
Assistant Examiner—Scott Anchell
Attorney, Agent, or Firm—Seed and Berry

[57] ABSTRACT

An actuator having a body with interior helical grooves, an output shaft with exterior helical grooves, a set of rollers in rolling engagement with the body and output shaft grooves, and a piston sleeve axially movable within the body and retaining the rollers in a fixed axial and circumferential position relative to the piston sleeve during operation of the actuator. A spring is positioned within the body to one axial side of the piston sleeve to apply a linear force thereto. The actuator converts a linear force on the piston sleeve into a rotational force on the output shaft, and vice versa.

40 Claims, 2 Drawing Sheets

U.S. PATENT DOCUMENTS

| | | | |
|---|---|---|---|
| 3,333,483 | 9/1967 | Maci et al. | 74/424.8 |
| 3,406,584 | 10/1968 | Roantree | 74/424.8 |
| 3,508,452 | 4/1970 | Roantree | 74/424.8 |
| 3,513,754 | 5/1970 | John | 92/33 |
| 3,554,457 | 1/1971 | Hutzenlaub et al. | 384/504 |
| 3,577,796 | 5/1971 | Eissfeldt | 74/459 |
| 3,585,869 | 6/1971 | Lemor | 74/89.15 |
| 3,595,094 | 7/1971 | Lemor | 74/89.14 |
| 3,628,397 | 12/1971 | Sheesley | 74/424.8 VA |
| 3,638,507 | 2/1972 | Orner | 74/424.8 |
| 3,640,140 | 2/1972 | Dulich et al. | 74/424.8 VA |
| 3,670,583 | 6/1972 | Leming | 74/89.15 |
| 3,847,033 | 11/1974 | Toth | 74/459 |
| 3,861,226 | 1/1975 | Stanley | 74/89.15 |
| 3,965,761 | 6/1976 | Stanley | 74/89.15 |
| 3,989,223 | 11/1976 | Burkhardt et al. | 74/424.8 VA |
| 4,022,076 | 5/1977 | Metz | 74/441 |
| 4,033,194 | 7/1977 | Stanley | 74/89.15 |
| 4,036,074 | 7/1977 | Bodnar | 74/409 |
| 4,050,319 | 9/1977 | Stanley | 74/89.15 |
| 4,276,003 | 6/1981 | Perkins et al. | 417/415 |
| 4,313,367 | 2/1982 | Weyer | 92/33 |
| 4,369,011 | 1/1983 | Ploss | 411/223 |
| 4,409,888 | 10/1983 | Weyer | 92/31 |
| 4,425,009 | 1/1984 | Fillon et al. | 384/477 |
| 4,493,614 | 1/1985 | Chu et al. | 417/22 |
| 4,499,813 | 2/1985 | Lampert | 92/31 |
| 4,576,057 | 3/1986 | Saari | 74/424.8 C |
| 4,590,816 | 5/1986 | Weyer | 74/424.8 NA |
| 4,603,616 | 8/1986 | Zajac | 92/33 |
| 4,741,250 | 5/1988 | Weyer | 92/33 |

OTHER PUBLICATIONS

Moscow Bauman Tech. Coll., Week 84/20–issued 27 Jun. 1984, a one-page Description.

Mechanisms, Linkages, and Mechanical Controls, by Chironis, a 4-page Brochure.

FIG. 1

SPRING ACTUATOR WITH ROLLERS

DESCRIPTION

Cross-References to Related Applications

This is a continuation-in-part application of applications Ser. No. 126,837, filed Nov. 30, 1987, now U.S. Pat. No. 4,881,419 and Ser. No. 204,521, filed June 9, 1988 now U.S. Pat. No. 4,945,778; which are continuation-in-part applications of applications Ser. No. 006,007, filed Jan. 20, 1987, now issued as U.S. Pat. No. 4,838,103; Ser. No. 931,223, filed Nov. 14, 1986, now issued as U.S. Pat. No. 4,846,007; Ser. No. 881,904, filed July 3, 1986, now issued as U.S. Pat. No. 4,741,250; which are continuation-in-part applications of Ser. No. 662,256, filed Oct. 17, 1984, now issued as U.S. Pat. No. 4,667,528; Ser. No. 692,293, filed Jan. 17, 1985, now issued as U.S. Pat. No. 4,683,767; and Ser. No. 803,954, filed Dec. 2, 1985, now issued as U.S. Pat. No. 4,691,582; which are continuation-in-part applications of application Ser. No. 575,228, filed Jan. 30, 1984, now issued as U.S. Pat. No. 4,590,816.

TECHNICAL FIELD

The present invention relates generally to spring actuators and other actuators which convert an axial force into a rotational force on an output member, or vice versa.

BACKGROUND OF THE INVENTION

It is sometimes desirable to apply a linear force using a spring or other source of energy and convert that force into a rotational force. For example, emergency actuators are often spring-powered to close a valve or actuate other equipment in an emergency situation when the normal source of power used to operate the valve or equipment is lost, whether that source of power be hydraulic, electrical, or otherwise. A typical emergency valve actuator, used with a fuel line valve and operated by hydraulic fluid pressure, will be driven by a spring to close the valve, in case hydraulic pressure is lost, in order to avoid fuel leaks.

In other situations, it is desirable to convert a force generated by a spring, compressed air, or otherwise in a linear manner into a rotational force, and vice versa. One such situation is a door closer attached to a door through a lever arm so that when the door is opened, the force applied to the door by the person opening it also rotates an output shaft of the door closer. The rotational force exerted on the output shaft causes compression of a spring inside the door opener; and when the door is released, the stored energy in the compressed spring then causes the output shaft to rotate and apply a closure force on the door through the lever arm. In such a device, it is important to efficiently convert the rotational force on the output shaft to a force sufficient to compress the spring, and then efficiently convert the stored energy in the compressed spring back to a rotational force on the output shaft. Preferably, the door closer should have a very compact design with a short length.

It is also very desirable to have a device with a high torque output which, with high efficiency, converts a force applied in a linear manner to a rotational force, and vice versa. The internal mechanism used in the device to accomplish the conversion should have a low frictional coefficient and should be able to handle large loads without binding. The device should also be able to handle large axial and radial shaft loads. The device should be relatively light in weight and small in size, and be relatively easy and inexpensive to manufacture. The device should have an uncomplicated and strong design to increase reliability, and be usable for heavy-duty applications. The present invention fulfills these needs and further provides other related advantages.

DISCLOSURE OF THE INVENTION

The present invention resides in an actuator with a body; an axially extending drive member supported for movement relative to the body and connectable to an external device, at least one of the body or the drive member having at least one helical groove formed on a surface portion thereof positioned within the body; at least one roller having at least one circumferential ridge; a carrier axially movably mounted within the body and rotatably retaining the roller in a fixed axial and circumferential position relative to the carrier during operation of the actuator; and means for axially moving the carrier in at least one axial direction within the body.

In a preferred embodiment, the carrier is a piston sleeve and pressurized hydraulic fluid can be applied to one or both axial sides thereof to axially move the piston sleeve within the body. In the illustrated embodiments, a spring is mounted within the body to apply an axial force on the carrier. These embodiments use rollers retained by the carrier in a circumferentially distributed arrangement, with the rollers in seated engagement with both a grooved body inward surface portion and a grooved drive member outward surface portion for transmitting force between the body, drive member, and carrier. The actuator may further include spindles supported by a coaxially extending support arm disposed in an aperture in the carrier. The rollers may each comprise a pair of roller disks mounted on one spindle. The invention may further include means for selectively and adjustably axially moving one of the roller disks of a roller relative to the other within at least a limited range to eliminate backlash.

Other features and advantages of the invention will become apparent from the following detailed description, taken in conjunction with the accompanying drawings.

DETAILED DESCRIPTION OF THE INVENTION

As shown in the drawings for purposes of illustration, the present invention is embodied in a device for converting a linear force into a rotary force, and vice versa. A first embodiment of the device is a rotary spring actuator 10, shown in FIG. 1. The actuator 10 includes an elongated housing or body 12 having a cylindrical sidewall 14, and first and second ends 16 and 18, respectively. The body sidewall 14 is formed in first and second body halves 14a and 14b, respectively. Each body half has a threaded inward end portion 14c threadably connected to the inward end portion of the other body half. A plurality of setscrews 19 lock the body halves 14a and 14b against rotation relative to each other. An elongated rotary output shaft 20 having a hollow center bore 21 is coaxially positioned within the body 12 and supported for rotation relative to the body.

Figure 1:
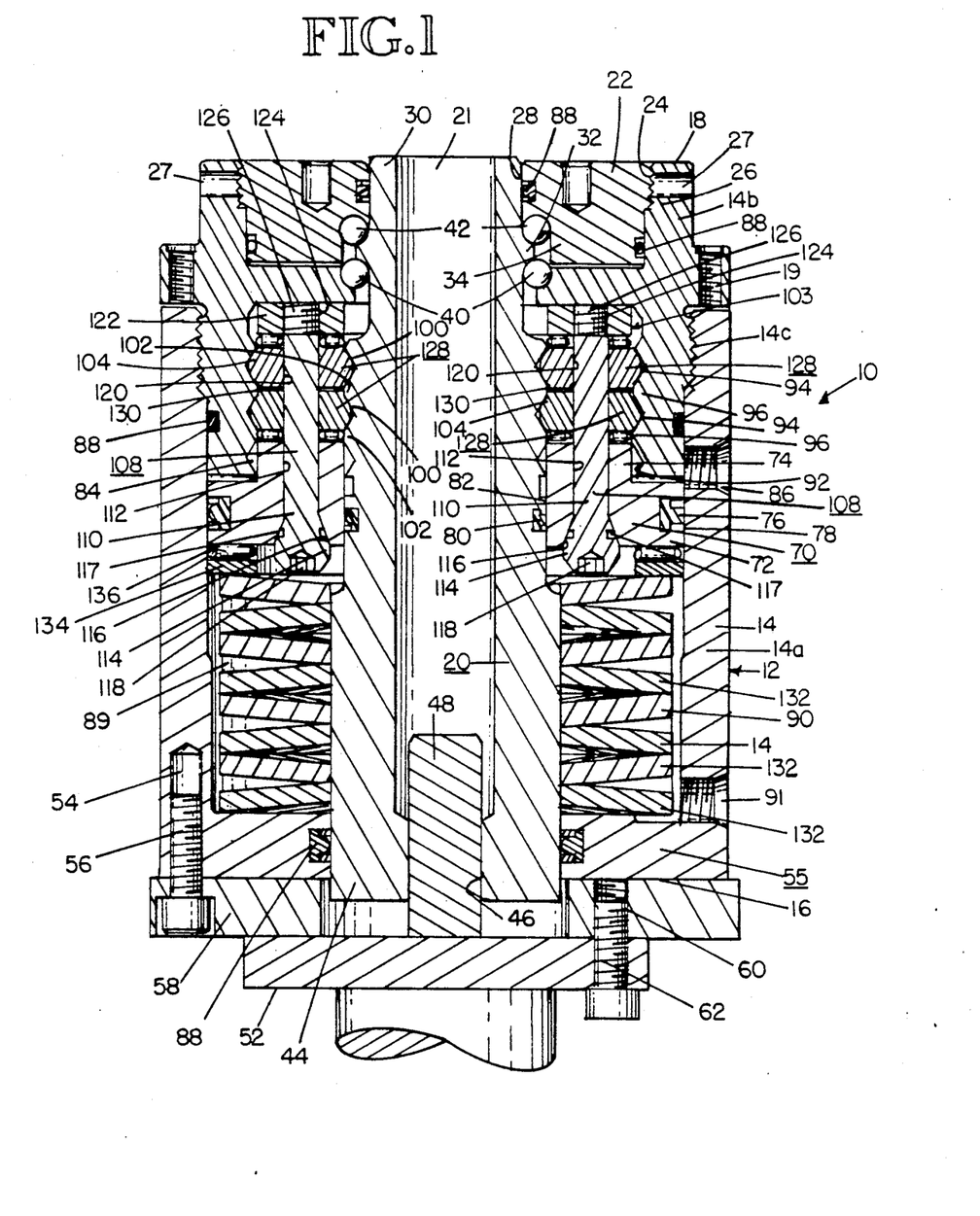
FIG. 1 is a side elevational, sectional view of a fluid-powered rotary spring actuator embodying the present invention.

An annular end cap 22 is positioned at the second body end 18 and has a threaded outer perimeter portion 24 threadably attached to a threaded end portion 26 of the second body half 14b at the second body end 18. Setscrews 27 are provided to lock the end cap in place. The end cap 22 has a central aperture 28 to receive a second end portion 30 of the shaft 20 toward the second body end 18.

Axially inward of the shaft second end portion 30, the shaft 20 has a radially outward extending flange portion 32 positioned between the end cap 22 and an annular body flange portion 34 of the second body half 14b which projects radially inward. The shaft 20 is rotatably held in place against axial thrust by thrust ball bearings 40 disposed between the shaft flange portion 32 and the body flange portion 34, and by thrust ball bearings 42 disposed between the shaft flange portion and the end cap 22. The shaft flange portion 32, the body flange portion 34, and the end cap 22 have corresponding bearing races to receive the ball bearings 40 and 42.

A first shaft end portion 44 toward the first body end 16 has a slotted shaft opening 46 sized to receive a correspondingly shaped rotatable member 48 of an external device 52 for drivably coupling the actuator 10 to the device. While a slotted arrangement is shown, any conventional means of attachment may be used. The body 12 has a plurality of threaded recesses 54 circumferentially spaced about a radially inward projecting body flange portion 55 at the first body end 16, sized to threadably receive fasteners 56 to attach the body to a mounting plate 58. The mounting plate 58 has a plurality of threaded recesses 60 circumferentially spaced about the mounting plate, sized to threadably receive fasteners 62 to attach the mounting plate to the external device 52. It is to be understood that while the invention is illustrated with the shaft 20 providing the rotational drive, in other applications the shaft may be held stationary and the rotational drive provided by rotation of the body 12.

A carrier or piston sleeve 70 is coaxially and reciprocally mounted within the body 12 and coaxially about the shaft 20. The piston sleeve 70 has a head portion 72 positioned toward the first body end 16, and a cylindrical sleeve portion 74 fixedly attached to the head portion and extending axially therefrom toward the second body end 18.

The head portion 72 carries a conventional seal 76, disposed between the head portion and a corresponding interior smooth wall portion 78 of the body sidewall 14 of the first body half 14a, and the shaft 20 carries a conventional seal 80, disposed between the shaft and an interior smooth wall portion 82 of the piston head portion 72, to define a fluid-tight compartment 84 to the side of the head portion 72 toward the second body end 18. The smooth sidewall portion 78 of the body sidewall 14 and the smooth sidewall portion 82 of the piston head portion 72 have sufficient axial length to accommodate the full stroke of the head portion 72 within the body 12.

Movement of the piston sleeve 70 within the body 12 toward the first body end 16 occurs when hydraulic fluid under pressure selectively enters through a port 86 located in the first body half 14a, which communicates with the fluid-tight compartment 84. As used herein, "fluid" will refer to hydraulic oil, air, or any other fluid suitable for use in the actuator 10. Conventional seals 88 are disposed between the end cap 22 and the sidewall 14, between the shaft second end portion 30 and the end cap, and between the first and second body halves 14a and 14b, adjacent to their threaded end portions 14c, to prevent fluid leakage from the compartment 84.

The application of fluid pressure to the compartment 84 produces axial movement of the piston sleeve 70 toward the first body end 16. As will be described in more detail below, a spring 90 is positioned within a compartment 89 of the body 12 to the side of the head portion 72 toward the first body end 16. The spring 90 is compressed as the fluid pressure axially moves the piston sleeve 70 toward the first body end 16. The stored energy of the compressed spring 90 applies an axial force on the piston sleeve 70 toward the second body end 18; and when the fluid pressure is removed from the compartment 84, this stored spring energy produces axial moVement of the piston sleeve toward the second body end. The result is that the actuator 10 provides relative rotational movement between the body 12 and the shaft 20 through the conversion of linear movement of the piston sleeve 70 into rotational movement of the shaft in a manner that will be described in more detail below. When the external device 52 to which the actuator 10 is mounted is a shutoff valve and the rotatable member 48 a valve stem, the actuator serves to close the valve by the rotation of the shaft 20, which results when the spring 90 has been moved into a compressed state and sometime thereafter fluid pressure is lost, such as in an emergency.

A port 91 communicates with the compartment 89 of the body 12, in which the spring 90 is positioned. A breather cap with a filter (not shown) can be connected to the port 91 to provide the air in the compartment 89 with a means of escape when the piston sleeve 70 moves toward the first body end 16 and a means for air to re-enter the compartment 89 when the piston sleeve moves toward the second body end 18. The filter prevents dirt in the air from fouling the operation of the actuator 10.

In other applications, a source of lubricating fluid (not shown) can be connected to the port 91 instead of simply connecting the compartment 89 to the atmosphere. This provides for lubrication of the spring 90 and the other parts thereby exposed to the lubricating fluid. One of the conventional seals 88 is disposed between the body flange portion 55 and the shaft 20 to prevent fluid leakage from the compartment 89.

Yet another application for the actuator 10 of FIG. 1 is as a fluid-power device wherein hydraulic fluid under pressure can be selectively used to drive the piston sleeve 70 not only toward the first body end 16, but also toward the second body end 18. This is accomplished by connecting a source of hydraulic fluid under pressure to port 91, which communicates with compartment 89, in the same fashion as described above for the application of fluid pressure to port 86, which communicates with compartment 84. By the selective application of fluid pressure to ports 86 and 91, the carrier 70 can be caused to reciprocate within the body 12 and alternately rotate the shaft 20 in one, then the other, rotational direction, such as is needed to open and close a valve. In the event of a pressure failure in the hydraulic fluid supply, the spring 90 applies an axial force to the piston sleeve 70 sufficient to rotate the shaft 20 in a direction to close the valve to which it is connected.

In another embodiment, which is not illustrated, of the invention of FIG. 1, the spring 90 can be completely eliminated as the means for axially moving the piston sleeve 70 within the body 12, and only the pressurized hydraulic fluid applied to port 91 is used to apply an axial force to the piston head portion 72 to move it toward the second end 18.

An inward facing surface portion 92 of the second body half 14b located toward the second body end 18, axially inward of the body flange portion 34, has cut therein a pair of helical grooves 94 having the same lead angle and a uniform lead and axial pitch. The helical body grooves 94 extend about the sidewall 14 and define helical ridges 96.

An outward facing surface portion 98 of the shaft 20 has cut therein a pair of helical grooves 100 having the same lead angle and a uniform lead and axial pitch. The helical shaft grooves 100 extend about the shaft 20 and define helical ridges 102. The outward shaft surface portion 98 is located generally opposite the grooved inward body surface portion 92 and spaced apart radially inward therefrom to define a circumferential space 103 therebetween.

The helical body grooves 94 have an opposite hand or direction of turn from the helical shaft grooves 100 but have substantially the same axial pitch as the helical shaft grooves. In the embodiment of FIG. 1, the helical body grooves 94 are left-hand and the helical shaft grooves 100 are right-hand. The number of grooves or groove starts comprising the plurality of helical body and shaft grooves 94 and 100 varies from design to design, but preferably the numbers used are interrelated.

A plurality of force-transmitting rollers 104 are disposed in a circumferentially aligned row in the circumferential space 103 between the grooved inward body surface portion 92 and the grooved outward shaft surface portion 98. The rollers rolling along the helical body and shaft grooves 94 and 100 produce a planetary-like action about the shaft 20 as the shaft rotates. The rollers 104 each have an outward facing surface with a pair of circumferential ridges which define circumferential grooves. The circumferential ridges and grooves of each roller 104 extend about the roller in parallel, spaced-apart radial planes. The circumferential ridges of the rollers 104 have substantially the same axial pitch as the helical body and shaft grooves 94 and 100. The rollers 104 preferably have a pitch diameter (PD3) based upon the first pitch diameter (PD1) of the grooved inward body surface portion 92 and the second pitch diameter (PD2) of the grooved outward shaft surface portion 98, substantially according to the relationship:

$$PD3 = \frac{PD1 - PD2}{2}$$

As used herein, "pitch diameter" is the diameter of the groove part measured from the groove half-depth position.

The rollers 104 are rotatably retained by a plurality of cylindrical shaft spindles 108 in a fixed axial and circumferential position relative to the piston sleeve 70 as the piston sleeve reciprocates within the body 12 during operation of the actuator 10. Each of the spindles 108 has a coaxially extending and integrally formed support arm portion 110 disposed in one of a plurality of bore holes 112 formed in the piston sleeve 70. The bore holes 112 are evenly circumferentially spaced apart about the piston sleeve 70 and axially extend fully through the head portion 72 and the sleeve portion 74 thereof. The support arm portion 110 has a conical head 114 received in a countersink 116 formed in the head portion 72. An O-ring seal 117 is provided in the head 114 to prevent fluid leakage from the compartment 84. A hexagonal recess 118 is provided in the axial end face of the head 114 to receive a correspondingly shaped tool for rotation of the spindles 108 to eliminate backlash, as will be described in more detail below.

Toward the second body end 18, the spindles 108 project into the circumferential space 103 and each holds one of the rollers 104 restrained against axial movement relative to the spindle for rotation about the spindle on an axis in parallel axial alignment with the body 12. In alternative constructions, the spindles may be designed to hold the rollers at a skewed angle. The spindles 108 also retain the rollers 104 in circumferentially distributed, spaced-apart positions within the circumferential space 103 about the shaft 20, with each of the rollers in seated engagement and coacting with both the helical body grooves 94 and the helical shaft grooves 100 for transmitting force between the body 12, the shaft 20, and the piston sleeve 70. Each ridge of the rollers 104 is positioned for rolling travel in corresponding grooves of both the helical body grooves 94 and the helical shaft grooves 100, and the corresponding ridges of adjacent rollers are axially positioned in generally the same plane or may be axially offset from one another, as desired.

The spindles 108 are arranged in parallel axial alignment with the body 12, and each has one of the rollers 104 coaxially and rotatably retained thereon and restrained against axial movement relative to the spindle. The rollers 104 each have a longitudinally extending, coaxial roller bore therethrough with a self-lubricating coating for rotatably receiving a smooth-surfaced end portion 120 of one of the spindles 108 projecting outward beyond the end of the sleeve portion 74 of the piston sleeve 70. The roller 104 is held in place on the spindle 108 by an annular spindle support plate 122. The support plate 122 has a plurality of circumferentially spaced-apart, threaded holes 124 arranged to each threadably receive a threaded free end portion 126 of one of the spindles therein. The support plate 122 reduces problems and possible failure under large loads which may be encountered by the cantilever-supported spindles, and, as will be described below, assists in the adjustment to eliminate backlash. In the embodiment of the invention illustrated in FIG. 1, each of the rollers 104 comprises two annular roller disks 128 independently and rotatably disposed on the spindle end portion 120 in juxtaposition. The two rollers disks 128 operate together to form the roller 104.

Linear movement of the piston sleeve 70 within the body 12 produces rotation of the piston sleeve and the shaft 20 through the force-transmitting capability of the rollers 104. As the piston sleeve 70 linearly moves in one or the other axial direction within the body 12 through application of fluid pressure to the fluid-tight compartment 84 or the stored energy of the spring 90 applied to the piston sleeve, torque is transmitted by the rollers 104 to the piston sleeve through their coaction with the helical body grooves 94. As previously noted, a source of hydraulic fluid under pressure may also be connected to the port 91 to apply fluid pressure to the compartment 89. In which case, the fluid pressure and the spring 90 in combination would linearly move the piston sleeve 70 toward the second body end 18. The axial force created by fluid pressure on the head portion 72 when applied to compartment 84, or the axial force applied by the spring 90 (and the fluid pressure to compartment 89, if used) on the piston sleeve 70 when the fluid pressure to compartment 84 has been removed, causes the rollers 104 to roll along the helical body grooves 94 and transmit torque to the piston sleeve. The transmitted torque causes the piston sleeve 70 to rotate as it moves axially. The resulting linear and rotational movement of the piston sleeve 70 transmits both axial and rotational force to the shaft 20 through the coaction of the rollers 104 with the helical shaft grooves 100. The transmitted force causes the shaft 20 to rotate relative to the body 12, since axial movement of the shaft is restricted by the thrust ball bearings 40 and 42. As such, the axial movement of the piston sleeve 70 is converted into rotational movement of the shaft 20 relative to the body 12. The resulting movement of the rollers 104 and shaft 20 relative to the body 12 when viewed from the body ends is much like the movement of a planetary gear arrangement. In similar but reverse fashion, should a rotational force be applied to the shaft 20, the piston sleeve 70 would be moved axially within the body, as will be described below for the embodiment of FIG. 2.

Still referring to the embodiment of FIG. 1, the actuator 10 is provided with means for eliminating backlash in the force-transmitting parts and for axially preloading the piston sleeve 70 and the rollers 104. Backlash results from the slack or free movement between the force-transmitting parts of the actuator. The slack is usually due to the sizing of the grooves of the body 12 and shaft 20 and the rollers 104 positioned therein, which transmit force between the body and the shaft through the reciprocation of the piston sleeve 70. Backlash occurs as the piston sleeve 70 moves from one axial direction to the other within the body.

As previously described, each of the spindles 108 has a roller 104 rotatably mounted thereon, and each roller is comprised of two roller disks 128. To provide for backlash elimination and preloading, the roller disks 128 are sized to produce an adjustment space 130 between the two roller disks which comprise the roller when installed on the spindle end portion 120, and the piston sleeve 70 is positioned within the body 12 with the shaft 20 in place. As will be described, this adjustment space 130 allows for sufficient axial movement of the roller disks 128 toward each other to firmly engage between the ridge portions of the two roller disks, one of the ridges of the helical body grooves 94 and one of the ridges of the helical shaft grooves 100.

The two roller disks 128 of the roller 104 are selectively and adjustably moved toward each other by adjustably turning the spindle 108 carrying the two roller disks. This is accomplished using a hexagonal headed tool (not shown) inserted into the hexagonal recess 118 for the spindle head 114 prior to the second body half 14b being attached to the first body half 14a. By so adjustably turning the support arm head 114, the support plate 122 is drawn toward the first body end 16 and the two roller disks 128 of the roller 104 being adjusted are caused to move together and clamp therebetween the ridges of the corresponding helical body and shaft grooves 94 and 100. This leaves one of the two roller disks 128 of each roller 104 in firm rolling engagement with the ridges of the body and shaft grooves 94 and 100, whether the piston sleeve 70 is traveling axially toward the first body end 16 or the second body end 18. Thus each roller 104 in the set of rollers of the piston sleeve 70 carries part of the load regardless of the direction of axial travel of the piston sleeve.

The turning of one spindle 108 to adjust out slack and to preload the rollers 104 also causes the annular support plate 122 to have a similar effect, although to a lesser extent, on the other rollers. As such, the backlash elimination adjustment should be accomplished by progressively turning all spindles 108 in sequence to partially and gradually adjust out backlash rather than attempting to fully adjust backlash out of one spindle before adjusting the other spindles.

When substantially all slack between the rollers 104 and the helical body grooves 94 and between the rollers and the shaft grooves 100 has been eliminated, further axial adjustment of the roller disks 128 will apply an axial preloading force between the rollers and the helical body and shaft grooves. Should usage of the actuator 10 cause wear of the grooves or the rollers seated therein, or should slack occur for any other reason, the slack can be removed in the same manner described above by further axial adjustment of the spindles.

With the present invention, the grooves may be machined using conventional machining techniques and standard tolerances, and the slack which creates the backlash problem can be eliminated by adjustment prior to operation of the actuator 10. Furthermore, the grooves can be machined to a size which permits easy assembly of the actuator and the slack thereby introduced can be eliminated by adjustment.

The spring 90 in the presently preferred embodiment of the invention is a stack of annular Belleville springs 132 coaxially arranged about the shaft 20. The Belleville spring 132 adjacent to the piston sleeve 70 directly contacts an annular bearing plate 134, and a needle roller and cage assembly thrust bearing 136 is positioned between the bearing plate and the head portion 72 of the piston sleeve. The thrust bearing 136 reduces the drag the spring 90 applies to the piston sleeve 70 as the piston sleeve rotates as a result of fluid pressure applied to compartment 84, or the stored spring energy of the spring 90 (and the fluid pressure to compartment 89, if used) when fluid pressure is removed from compartment 84. The same function is served by the thrust bearing 136 if a rotational drive force is applied to the shaft 20 and is then converted to a linear force on the piston sleeve 70, thus causing the piston sleeve to rotate.

A significant advantage of the present invention is the reduction in required machining time and cost, since helical grooves 94 and 100 are utilized only on the body 12 and the shaft 20, rather than on the four helical grooved surfaces needed for force transmission in actuators using conventional helical splines or ball races. Cutting grooves on the piston sleeve 70 has been completely eliminated. As such, the number of helical grooves which must be cut with the expensive and slow precision equipment required to cut helical grooves is reduced, thus reducing the expense and time of manufacture. Moreover, the roller 104 can be simply and inexpensively manufactured. By utilizing backlash elimination, the parts need not be made to extremely close tolerances, further reducing the expense of manufacture.

The rollers 104 of the present invention achieve the benefit of reduced friction by using rolling friction, as do balls, rather than the sliding friction of splines, yet the friction reduction over splines can be achieved with rollers using a body 12 with less axial length than required for balls. Moreover, since the surface contact for rollers is spread over a greater area than with balls, the walls of the grooves with which the rollers coact can be thinner while still retaining adequate strength. This also allows the grooves to be placed closer together for more dense packing of the rollers than can be achieved with balls. As a result of these benefits, the overall actuator weight can be reduced compared to a ball actuator of equivalent power rating and a more reliable actuator produced.

Compared to splines, the rollers 104 also provide the benefit of serving as roller bearings to reduce frictional drag and to provide aligning support for the body 12, piston sleeve 70, and shaft 20. This facilitates easy shaft rotation and reduces shaft binding under extreme loads.

For ease of understanding, the components of the alternative embodiments of the invention described hereinafter will be similarly numbered with those of the first embodiment when of a similar construction. Only the differences in construction will be described in detail.

Figure 2:
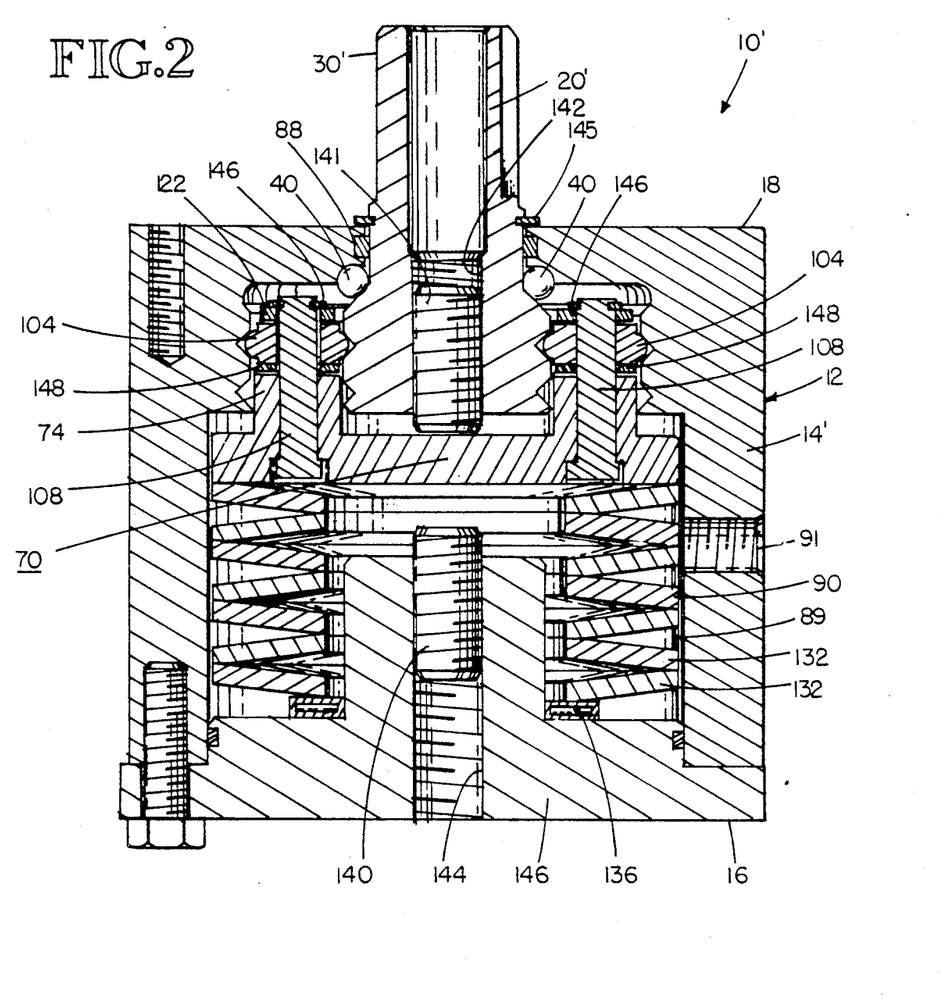
FIG. 2 is a side elevational, sectional view of an alternative embodiment of the invention.

An alternative embodiment of the invention is shown in FIG. 2 as an actuator 10' in which no hydraulic fluid is used. Instead, the spring 90 is compressed by a rotational force applied to the shaft 20 either during use or prior to use. When used as a door closer, the rotational force is applied to the shaft 20 when a person opens the door to which the shaft is connected through a conventional lever arm and gear mechanism (not shown). The force applied to the door by the person opening it both opens the door and also rotates the shaft 20. The rotational force applied to the shaft causes compression of the spring 90 as the piston sleeve 70 is caused to linearly move toward the first body end 16 through the coaction of the rollers 104 with the helical body and shaft grooves 94 and 100. When the door is released, the stored energy in the compressed spring applies a force on the piston sleeve 70 to linearly move it toward the second body end 18, thus causing rotation of the shaft 20 and applying a closure force on the door through the lever arm and gear mechanism to which the shaft is attached.

The actuator 10' of FIG. 2 can also be used in situations where the spring 90 is compressed prior to use. Once compressed, the shaft 20 is then connected to an external mechanism to which the shaft, driven by the compressed spring 90, applies a rotational force. This is useful where it is necessary to apply a unidirectional rotational biasing force, such as in a conveyor belt scraper. When used in such a scraper, the shaft 20 is attached to a scraper arm (not shown) which carries a scraper blade (not shown). The rotational biasing force rotates the arm to hold the blade in contact with the conveyor belt material-carrying surface at a position after the bulk of the material has been delivered, such as along the return run of the conveyor belt. If the blade encounters foreign material on the belt which it does not scrape fully free, the blade must ride over the material as the belt travels along. This causes the arm and the blade it carries to move away from the belt and rotate the shaft 20, causing additional compression of the spring 90 through the conversion of the resulting rotational force on the shaft 20 into linear movement of the piston sleeve 70. As soon as the foreign material passes by, the stored energy in the compressed spring 90 causes the piston sleeve 70 to move linearly and the shaft 20 to rotate, thus moving the arm and the scraper blade back to their original position.

As with the embodiment of FIG. 1, the actuator 10' provides a high-torque, efficient mechanism for converting a linear force to a rotational force, and vice versa. The actuator 10' can be manufactured with a relatively compact and lightweight design, and can be simply and inexpensively manufactured.

To limit the linear end travel of the piston sleeve 70 toward the first and second body ends 16 and 18 in the embodiment of FIG. 2, a pair of axially adjustable screws 140 and 141 are provided. One screw 141 is threadably received in a threaded aperture 142 in the shaft 20, and the other screw 140 is threadably received in a threaded aperture 144 in a first end cap 146 at the first body end 16.

The actuator 10' of FIG. 2 varies from the embodiment of FIG. 1 in a number of other ways, but the overall function is generally the same. One difference in the actuator 10' is its use of rollers 104 having only a single disk 128 without a backlash elimination mechanism. Correspondingly, the helical body groove 94 and the helical shaft groove 100 each comprise a single groove. Other less significant differences are the use of a shaft 20', which extends only partially through the body 12', and the use of body 12' with a single part sidewall 14'. The shaft 20' is retained against movement into the body 12' by a retaining clip 145. The second end portion 30' of the shaft 20' extends beyond the second body end 18 and is adapted to be connected to an external member (not shown). The actuator 10' uses the thrust bearing 136 positioned between the spring 90 and the first end cap 146, and the thrust bearing 136 carries its own thrust washers.

The spindles 108 are each connected to the support plate 122 by a retaining clip 146. An annular needle thrust bearing 148 is positioned on each spindle 108 between the sleeve portion 74 of the piston sleeve 70 (which is a simple roller carrier without a piston head portion) and the roller 104 mounted thereon.

It will be appreciated that, although specific embodiments of the invention have been described herein for purposes of illustration, various modifications may be made without departing from the spirit and scope of the invention. Accordingly, the invention is not limited except as by the appended claims.

I claim:

1. An actuator comprising:
   a body having a plurality of helical grooves formed on a radially inward facing surface portion thereof;
   an axially extending drive member supported for movement relative to said body and connectable to an external device, said drive member having a plurality of helical grooves formed on a radially outward facing surface portion thereof disposed within said body and confronting said grooved body inward surface portion, said grooved body surface portion and said grooved drive member surface portion defining a circumferential space therebetween, said drive member helical grooves having a hand turn opposite the hand turn of said body helical grooves and having substantially the same axial pitch as said body helical grooves;
   a plurality of rollers disposed in said circumferential space, each of said rollers having at least one circumferential ridge;
   a carrier axially movably mounted within said body, said carrier rotatably retaining said rollers in a fixed axial and circumferential position relative to said carrier during operation of the actuator, said carrier further retaining said rollers in circumferentially distributed positions in said circumferential space, with each of said rollers having said roller ridge thereof in seated rolling engagement with both said grooved body surface portion and said grooved drive member surface portion for transmitting force between said body, drive member and carrier, each ridge of said rollers being positioned for rolling travel in the corresponding grooves of said body and said drive member; and means for axially moving said carrier in at least one axial direction within said body.

2. The actuator of claim 1 wherein said means for axially moving said carrier includes a spring positioned within said body between said carrier and a stop portion of said body axially spaced from said carrier, said spring being compressed by said carrier upon movement of said carrier in an axial direction toward said body stop portion, said spring when compressed applying an axially directed force on said carrier to move said carrier in an axial direction away from said body stop portion.

3. The actuator of claim 2 wherein said means for axially moving said carrier further includes a piston axially movably mounted within said body and operatively engaging said carrier to move said carrier in at least said axial direction toward said body stop portion upon the application of pressurized fluid to said piston.

4. The actuator of claim 3 wherein said piston operatively engages said carrier to move said carrier in both said axial direction toward said body stop portion and said axial direction away from said body stop portion, the actuator further including means for selectively applying pressurized fluid to one or the other axial side of said piston to selectively move said carrier in one or the other of said axial directions.

5. The actuator of claim 1 wherein each of said rollers is comprised of at least two roller disks adjustably axially movable relative to each other within at least a limited range, and the actuator further includes adjustment means for selectively and adjustably axially moving one or the other of said roller disks of each of said rollers relative to the other within said limited range by an amount sufficient to eliminate backlash between said carrier and said grooved body and drive member surface portions as said carrier moves from one axial direction to the other.

6. The actuator of claim 1 wherein said carrier includes a plurality of spindles extending into said circumferential space and circumferentially distributed thereabout, said spindles each having at least one of said rollers coaxially and rotatably retained thereon and retained against axial movement relative to said spindles during operation of the actuator, said spindles being retained by said carrier to prevent axial movement of said spindles relative to said carrier during operation of the actuator.

7. The actuator of claim 6 wherein each of said rollers is comprised of at least two roller disks adjustably axially movable relative to each other within at least a limited range, and the actuator further includes adjustment means for selectively and adjustably axially moving one or the other of said roller disks of each of said rollers relative to the other within said limited range by an amount sufficient to eliminate backlash between said carrier and said grooved body and drive member surface portions as said carrier moves from one axial direction to the other, said two roller disks which comprise each of said rollers being axially spaced apart on said spindle on which retained by an adjustment space at least as large as said limited range, at least one of said two roller disks being axially movable through said adjustment space for selective axial movement of said movable roller disks relative to the other of said two rollers disks through said adjustment space to eliminate backlash by operation of said adjustment means.

8. The actuator of claim 7 wherein said two roller disks retained on each of said spindles each have a substantially coaxial roller bore therethrough rotatably receiving a correspondingly sized portion of one of said spindles, said movable roller disk being axially slidable on said spindle portion independent of the other of said roller disks.

9. The actuator of claim 7 wherein said adjustment means includes engagement means disposed on said spindles and spaced away from said carrier, with said rollers positioned therebetween for applying axial force on said roller disks of said rollers to move one or the other of said roller disks of each said roller relative to the other within said limited range by an amount sufficient to eliminate backlash.

10. The actuator of claim 9 wherein said engagement means operates to apply said axial force in response to rotation of said spindle, and said spindles are selectively and adjustably rotatable.

11. The actuator of claim 10 wherein said engagement means includes an engagement member axially movable on said spindles in response to rotation of said spindles to apply said axial force on said roller disks.

12. The actuator of claim 7 wherein said spindles each have a free, unattached, first end portion extending into a circumferential space adjacent to said grooved surface portion and circumferentially distributed thereabout, said spindle free end portions each having at least one of said rollers coaxially and rotatably retained thereon and retained against axial movement relative to said spindles during operation of the actuator, each said spindle having a second end portion attached to said carrier to support said first end portion in a cantilevered manner and to prevent axial and circumferential movement of said spindle, said carrier retaining said spindle free first end portions and said rollers rotatably retained thereon in a fixed axial and circumferential position relative to said carrier during operation of the actuator, said rollers on said spindles being retained by said carrier in a circumferentially distributed arrangement.

13. The actuator of claim 12 wherein said adjustment means includes a spindle support plate having a plurality of circumferentially distributed spindle openings, each said spindle opening receiving one of said spindle free first end portions therethrough and providing support thereto against lateral forces on said spindles, said support plate being attached to said spindles for travel therewith during operation of the actuator.

14. The actuator of claim 12 wherein said carrier has a plurality of circumferentially spaced-apart bore holes and said spindle second end portions are rotatably disposed in said carrier bore holes, and wherein the actuator further includes means for permitting selective adjustable rotation of said spindle second end portions in said carrier bore holes to eliminate backlash while preventing axial movement of said spindles toward said rollers relative to said carrier, said spindle first end portions having a threaded end portion, and wherein said adjustment means includes an independently and adjustably axially movable spindle support plate having a plurality of circumferentially distributed spindle-receiving openings threaded to correspond to said spindle threaded end portions, each said spindle-receiving opening threadably receiving one of said spindle threaded end portions of said spindle free first end portions therethrough and providing support thereto against lateral forces on said spindles, said support plate being attached to said spindles for travel therewith during operation of the actuator, selective adjustable rotation of said spindles axially moving said spindle support plate axially relative to said spindles and applying axial force on said spindle roller disks to move one or the other of said roller disks of each said roller relative to the other within said limited range by an amount sufficient to eliminate backlash.

15. An actuator comprising:
a body;
an axially extending drive member supported for movement relative to said body and connectable to an external device, one of said body or drive member having a plurality of helical grooves formed on a surface portion thereof positioned within said body;
a carrier axially movably mounted within said body;
a plurality of rollers, each of said rollers having at least one circumferential ridge;
a plurality of cantilever spindles having a free, unattached, first end portion extending into a circumferential space adjacent to said grooved surface portion and circumferentially distributed thereabout, said spindle free end portions each having at least one of said rollers coaxially and rotatably retained thereon and retained against axial movement relative to said spindles, each said spindle having a second end portion attached to said carrier to support said first end portion in a cantilevered manner and to prevent axial and circumferential movement of said spindle, said carrier retaining said spindle free first end portions and said rollers rotatably retained thereon in a fixed axial and circumferential position relative to said carrier during operation of the actuator, said rollers on said spindles being retained by said carrier in a circumferentially distributed arrangement in seated rolling engagement with said groove surface portion for transmitting force between said carrier and the one of said body or drive member having said grooved surface portion, each said ridge of said rollers being positioned for rolling travel in the corresponding grooves of said grooved surface portion;
means for transmitting torque between said carrier and the other of said body or said drive member; and
means for axially moving said carrier in at least one axial direction within said body.

16. The actuator of claim 15 wherein said means for axially moving said carrier includes a spring positioned within said body between said carrier and a stop portion of said body axially spaced from said carrier, said spring being compressed by said carrier upon movement of said carrier in an axial direction toward said body stop portion, said spring when compressed applying an axially directed force on said carrier to move said carrier in an axial direction away from said body stop portion.

17. The actuator of claim 16 wherein said means for axially moving said carrier further includes a piston axially movably mounted within said body and operatively engaging said carrier to move said carrier in at least said axial direction toward said body stop portion upon the application of pressurized fluid to said piston.

18. The actuator of claim 17 wherein said piston operatively engages said carrier to move said carrier in both said axial direction toward said body stop portion and said axial direction away from said body stop portion, the actuator further including means for selectively applying pressurized fluid to one or the other axial side of said piston to selectively move said carrier in one or the other of said axial directions.

19. The actuator of claim 15, further including an annular spindle support plate having a central opening through which said drive member extends and a plurality of circumferentially distributed spindle openings, each said spindle opening receiving one of said spindle free first end portions therethrough and providing support thereto against lateral forces on said spindles, said support plate being attached to said spindles for travel therewith during operation of the actuator.

20. An actuator comprising:
a body;
an axially extending drive member supported for movement relative to said body and connectable to an external device, one of said body or said drive member having a plurality of helical grooves formed on a surface portion thereof and having an axial pitch and a lead angle with a left-hand or right-hand turn;
a plurality of rollers, each of said rollers having at least one circumferential ridge;
a carrier axially movably mounted within said body, said carrier rotatably retaining said rollers in a fixed axial and circumferential position relative to said carrier during operation of the actuator, said rollers being retained by said carrier in a circumferentially distributed arrangement in seated rolling engagement with said grooved surface portion for transmitting force between said carrier and the one of said body or said drive member having said grooved surface portion, each ridge of said rollers being positioned for rolling travel in the corresponding grooves of said grooved surface portion;
means for transmitting torque between said reciprocating member and the other of said body or said drive member; and
means for axially moving said carrier in at least one axial direction within said body.

21. The actuator of claim 20 wherein said means for axially moving said carrier includes a spring positioned within said body between said carrier and a stop portion of said body axially spaced from said carrier, said spring being compressed by said carrier upon movement of said carrier in an axial direction toward said body stop portion, said spring when compressed applying an axially directed force on said carrier to move said carrier in an axial direction away from said body stop portion.

22. The actuator of claim 21 wherein said means for axially moving said carrier further includes a piston axially movably mounted within said body and operatively engaging said carrier to move said carrier in at least said axial direction toward said body stop portion upon the application of pressurized fluid to said piston.

23. The actuator of claim 22 wherein said piston operatively engages said carrier to move said carrier in both said axial direction toward said body stop portion and said axial direction away from said body stop portion, the actuator further including means for selectively applying pressurized fluid to one or the other axial side of said piston to selectively move said carrier in one or the other of said axial directions.

24. The actuator of claim 20 wherein said carrier includes a plurality of spindles, each rotatably and coaxially retaining at least one roller of said rollers and positioned adjacent to said grooved surface portion, said spindles being circumferentially distributed about said grooved surface portion to position said rollers in seated rolling engagement therewith, said spindles retaining said rollers against axial movement relative thereto, said spindles being retained by said carrier to prevent axial movement of said spindles relative to said carrier during operation of the actuator.

25. The actuator of claim 24 wherein each of said rollers is defined by a plurality of rings disposed on one of said spindles in juxtaposition, each of said rings having a radially outward facing surface portion shaped to form, in combination with the other of said plurality of rings, said roller ridges.

26. The actuator of claim 24 wherein each of said spindles is supported at one end by a cantilever support arm rigidly attached thereto, and said carrier includes a sleeve portion having a plurality of circumferentially spaced-apart bore holes formed in an end portion thereof, each said bore hole being sized to receive one of said support arms, said support arms being disposed in said sleeve bore holes with said spindles supported thereon and positioned axially beyond said end portion of said sleeve portion.

27. The actuator of claim 26 wherein said support arm and spindle for each of said rollers are attached together in coaxial relation to form a substantially straight, elongated member.

28. The actuator of claim 20 wherein each of said rollers is comprised of at least two roller disks adjustably axially movable relative to each other within at least a limited range, each said roller disk having at least one circumferential ridge, and the actuator further includes adjustment means for selectively and adjustably axially moving one of said roller disks of said roller relative to the other within said limited range by an amount sufficient to eliminate backlash between said carrier and said grooved surface portion as said carrier moves from one axial direction to the other within said body, while maintaining at least one or the other of said roller disks in rolling engagement with said grooved surface as said carrier moves in one axial direction and at least the other of said roller disks in rolling engagement with said grooved surface as said carrier moves in the other axial direction.

29. The actuator of claim 28 wherein said carrier includes a plurality of spindles, each extending to a position adjacent to said grooved surface portions, each said spindle having one of said rollers coaxially and rotatably retained thereon and retained against axial movement relative to said spindle during powered operation of the actuator, said spindle being retained by said carrier to prevent axial movement of said spindle relative to said carrier during operation of the actuator, said two roller disks which comprise said roller being axially spaced apart on said spindle by an adjustment space at least as large as said limited range, at least one of said two roller disks being axially movable through said adjustment space for axial movement of said movable roller disks relative to the other of said roller disks through said adjustment space to eliminate backlash by operation of said adjustment means.

30. The actuator of claim 29 wherein said two roller disks retained on said spindle each have a substantially coaxial roller bore therethrough rotatably receiving a correspondingly sized portion of said spindle, said movable roller disk being axially slidable on said spindle portion.

31. The actuator of claim 29 wherein said adjustment means includes an adjustment member disposed on said spindle spaced away from said carrier with said roller positioned therebetween, said adjustment member being axially movable on said spindle in response to rotation of said spindle to apply axial force on said roller disks to move one or the other of said roller disks relative to the other within said limited range by an amount sufficient to eliminate backlash, said spindle being selectively and adjustably rotatable to axially move said adjustment member.

32. The actuator of claim 28 wherein said spindles each have a free, unattached, first end portion extending into a circumferential space adjacent to said grooved surface portion and circumferentially distributed thereabout, said spindle free end portions each having at least one of said rollers coaxially and rotatably retained thereon and retained against axial movement relative to said spindles during operation of the actuator, each said spindle having a second end portion attached to said carrier to support said free first end portion in a cantilevered manner and to prevent axial and circumferential movement of said spindle, said carrier retaining said spindle free first end portions and said rollers rotatably retained thereon in a fixed axial and circumferential position relative to said carrier during operation of the actuator, said rollers on said spindles being retained by said carrier in a circumferentially distributed arrangement.

33. The actuator of claim 32 wherein said adjustment means includes a spindle support plate having a plurality of circumferentially distributed spindle openings, each said spindle opening receiving one of said spindle free first end portions therethrough and providing support thereto against lateral forces on said spindles, said support plate being attached to said spindles for travel therewith during operation of the actuator.

34. The actuator of claim 33 wherein said spindle support plate is annular, with a central opening through which said drive member extends, and said spindle openings are circumferentially distributed about said plate central opening.

35. The actuator of claim 32 wherein said carrier has a plurality of circumferentially spaced-apart bore holes extending fully therethrough, said spindle second end portions being disposed in said bore holes.

36. The actuator of claim 35 wherein said spindle second end portions are rotatably disposed in said bore holes in said carrier for selective adjustable rotation thereof, said adjustment means eliminating backlash in response to rotation of said spindle second end portions.

37. An actuator comprising:
a body;
an axially extending drive member supported for movement relative to said body and connectable to an external device, one of said body or drive member having a plurality of helical grooves formed on a surface portion thereof positioned within said body;
at least one roller having at least one circumferential ridge;

a carrier axially movably mounted within said body, said carrier rotatably retaining said roller in (a) fixed axial and circumferential position relative to said carrier during operation of the actuator, with said roller in seated rolling engagement with said grooved surface portion for transmitting force between said carrier and the one of said body or said drive member having said grooved surface portion, said ridge of said roller being positioned for rolling travel in said helical groove of said grooved surface portion;

means for transmitting torque between said carrier and the other of said body or said drive member; and means for axially moving said carrier in at least one axial direction within said body.

38. The actuator of claim 37 wherein said means for axially moving said carrier includes a spring positioned within said body between said carrier and a stop portion of said body axially spaced from said carrier, said spring being compressed by said carrier upon movement of said carrier in an axial direction toward said body stop portion, said spring when compressed applying an axially directed force on said carrier to move said carrier in an axial direction away from said body stop portion.

39. The actuator of claim 38 wherein said means for axially moving said carrier further includes a piston axially movably mounted within said body and operatively engaging said carrier to move said carrier in at least said axial direction toward said body stop portion upon the application of pressurized fluid to said piston.

40. The actuator of claim 39 wherein said piston operatively engages said carrier to move said carrier in both said axial direction toward said body stop portion and said axial direction away from said body stop portion, the actuator further including means for selectively applying pressurized fluid to one or the other axial side of said piston to selectively move said carrier in one or the other of said axial directions.

* * * * *